United States Patent [19]
Matsumoto et al.

[11] 3,934,150
[45] Jan. 20, 1976

[54] PHOTOGRAPHIC SHEET-LIKE FILM FEEDING DEVICE

[75] Inventors: Takaaki Matsumoto; Kaoru Tamura, both of Minami-ashigara, Japan

[73] Assignee: Fuji Photo Film Co., Ltd., Minami-ashigara, Japan

[22] Filed: Aug. 13, 1974

[21] Appl. No.: 497,157

[30] Foreign Application Priority Data
Aug. 17, 1973  Japan.......................... 48-96512[U]

[52] U.S. Cl................................. 250/468; 250/481
[51] Int. Cl.² ........................................ G11B 1/00
[58] Field of Search ........... 250/468, 469, 471, 475, 250/481

[56] References Cited
UNITED STATES PATENTS

| | | | |
|---|---|---|---|
| 3,075,080 | 1/1963 | Sano | 250/468 |
| 3,361,046 | 1/1968 | Gidlund | 250/469 |
| 3,828,196 | 8/1974 | Mika et al. | 250/468 |

*Primary Examiner*—Davis L. Willis
*Attorney, Agent, or Firm*—Sughrue, Rothwell, Mion, Zinn & Macpeak

[57] ABSTRACT

A photographic sheet film feeding device has a film loading section receiving sheets of film contained in an internally loaded bag in a light-tight condition and loading the same, a cutter mechanism for cutting and unsealing the lower end of the internally loaded bag, and a film discharging means for raising the internally loaded bag and a U-shaped doubling plate covering the two sides and the top edge of the film sheets in order to allow discharge of the sheets of film contained in the bag from the unsealed and cut portion of the internally loaded bag.

4 Claims, 4 Drawing Figures

PHOTOGRAPHIC SHEET-LIKE FILM FEEDING DEVICE

BACKGROUND OF THE INVENTION

1. Field of the Invention

This invention relates to a photographic sheet film feeding device used, for example, for loading a photographic sheet-like film sheet by sheet into a cassette.

2. Description of the Prior Art

In conventional X-ray photographic film feeding devices, sheets of film are removed from a bag i.e., an internally loaded bag, in a dark room to load them into a light-tight magazine, and the sheets of film retained in the feeding device are fed sheet by sheet from this magazine. Feeding devices of this kind however suffer from various disadvantages in that a dark room for loading must be provided; the loading is inefficient since the sheets of the film must be loaded into the magazine by hand in a dark room; pressure fogging and scratches are produced in the photosensitive materials for reasons as described above; and a heavy magazine must be carried about.

In order to remove the disadvantages noted above with respect to prior art devices, therefore, a device has been proposed in which the film in a state received in an internally loaded package is loaded into a film automatic feeding device (such as disclosed in U.S. patent application Ser. No. 438,516, filed Jan. 31, 1974), and the bag is unsealed to remove the film contained therein.

SUMMARY OF THE INVENTION

An object of this invention is to provide X-ray photographic film sheet feeding device of the type as described above, and in a preferred form of the invention, the internally loaded bag and a hygroscopic doubling plate (cardboard) laid on the film sheets are raised to be able to discharge and feed the lower end of the film sheets so that the sheets of film thus discharged can be removed therefrom and fed sheet by sheet.

BRIEF DESCRIPTION OF THE ACCOMPANIED DRAWINGS

DESCRIPTION OF THE PREFERRED EMBODIMENTS

The present invention will now be described with reference to the accompanying drawings.

The film feeding device of the invention comprises, in its broadest aspect, a film loading portion 1 for rendering the film received in an internally loading bag light-tight and loading the same, a bag cutter mechanism 2 for cutting and unsealing the lower end of the internally loaded bag, and a film discharging mechanism 3 for raising the bag and a hydroscopic doubling plate, which is adapted to protect the film and to control the humidity, so as to discharge the lower portion of the film received from the portion of the bag which has been opened by cutting.

Figure 1:
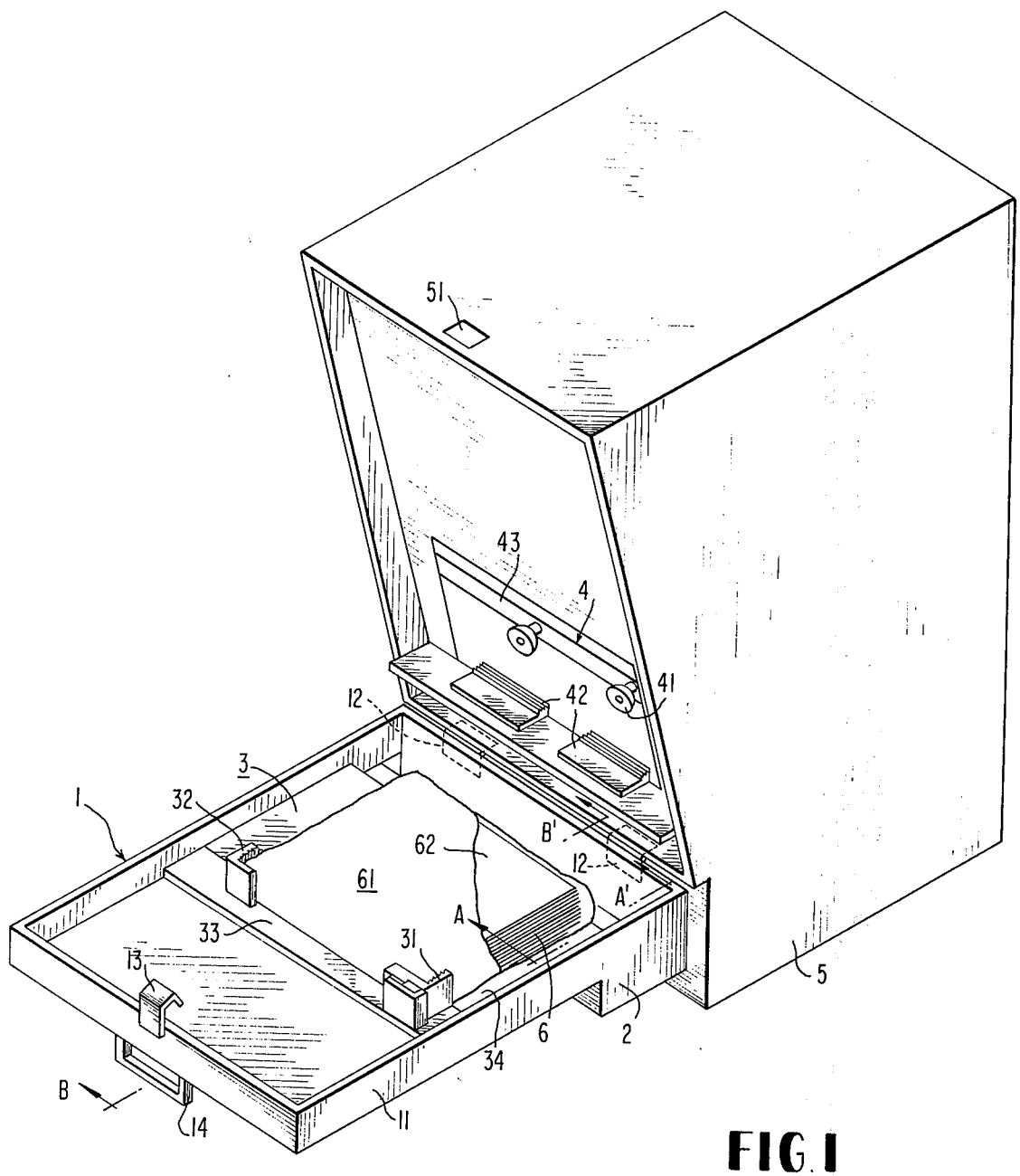
FIG. 1 is perspective view of the photographic sheet-like film feeding device of the invention when housing 11 is open.

These elements will individually be described in detail as follows: FIG. 1 is a perspective view showing the film loading portion 1 pivoted outwardly from a body 5. There is shown a housing 11 hinged on the body 5 through hinges 12, and an internally loaded bag 61 with film 6 contained therein is loaded inside the housing when the housing is opened and the housing is rendered internally light-tight when it is closed. A pawl 13 biased by means of a spring not shown is engaged, when the film loading portion 1 is closed on body 5, in an engaging slot 51 to hold the loading portion. A handle grip 14 is provided to rotate the film loading portion 1.

Figure 2:
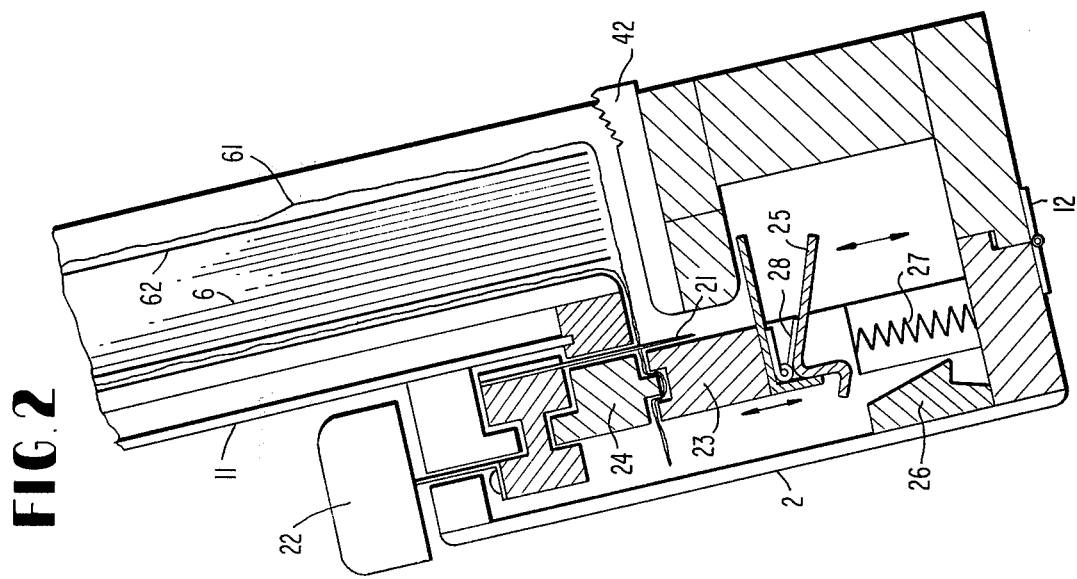
FIG. 2 is sectional view of cutter 2 taken along the A-A' line of FIG. 1.

Referring now to FIG. 2, a cutter mechanism 2 is shown. A cutter 21 is disposed integrally with a cutter knob 22 mounted outside the housing 11 and is slidable back and forth in the figure, and the knob 22 is slid to cut open the lower end of the bag 61. In order to lock the bag 61 so as to cut the lower end thereof, a female-shaped member 23 biased by a spring 27 for locking the lower end of the bag is pressed fit into engagement with a male-shaped member 24. Engaging members 25 and 26 are provided to maintain the locking female-shaped member 23 open against the spring 27 when the bag 61 is loaded, with engaging member 25 being biased clockwise by means of a spring 28.

Turning again to FIG. 1, the film discharging mechanism 3 comprises gripping members 31 and 32 for pressing and gripping the bag 61 with the film contained therein from both sides of the bag, one member being biased by means of a spring, e.g., a spring biasing gripping member 31. These gripping members 31 and 32 grip only the bag 61 and doubling plate 62. To this end, it is necessary to have the width of the doubling plate 62 larger than that of a photosensitive material sheets 6. These gripping members 31 and 32 are disposed on a sliding plate 33 slidable in a direction to raise the bag 61 and the doubling plate 62.

Describing the internally loaded bag 61 and the doubling plate 62, the bag 61 is formed of three layers, that is, an outer paper layer having a thickness of, e.g., about 40 microns, an intermediate aluminum layer having a thickness of, e.g., about 10 microns, and an inner polyethylene layer having a thickness of, e.g., about 100 microns. The doubling plate, e.g., a rigid paper having hygroscopic characteristics, has a thickness of about 1 mm (about 0.0393 inch) and a width of about 6 mm (0.236 inch) wider than that of film sheets 6. The dimension of the film sheets covered by the doubling plate is about 10 × 12 inches (254 mm × 304.80 mm). The width of the doubling plate are about 6 mm (0.236 inch) longer than 304.80 mm (12 inches).

Figure 4:
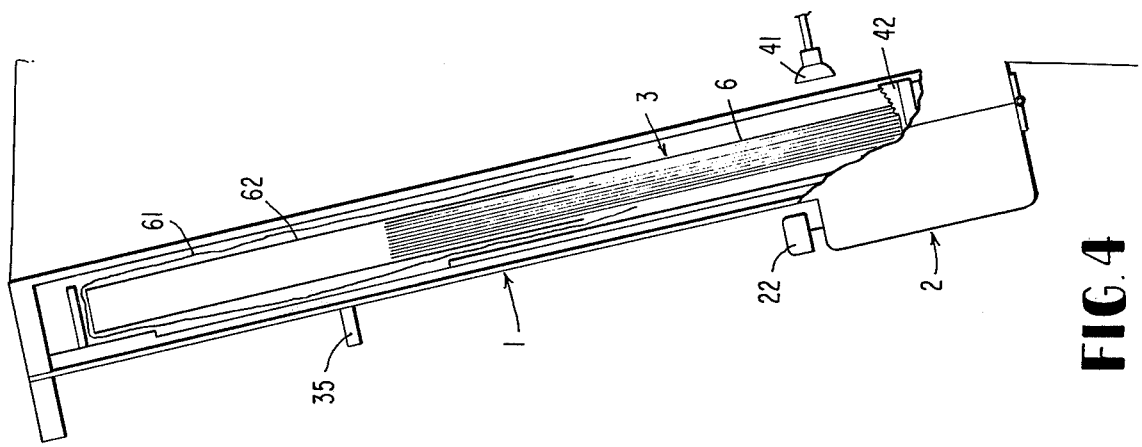
FIG. 4 is a sectional view of housing 11 taken along the B-B' line of FIG. 1.
Figure 3:
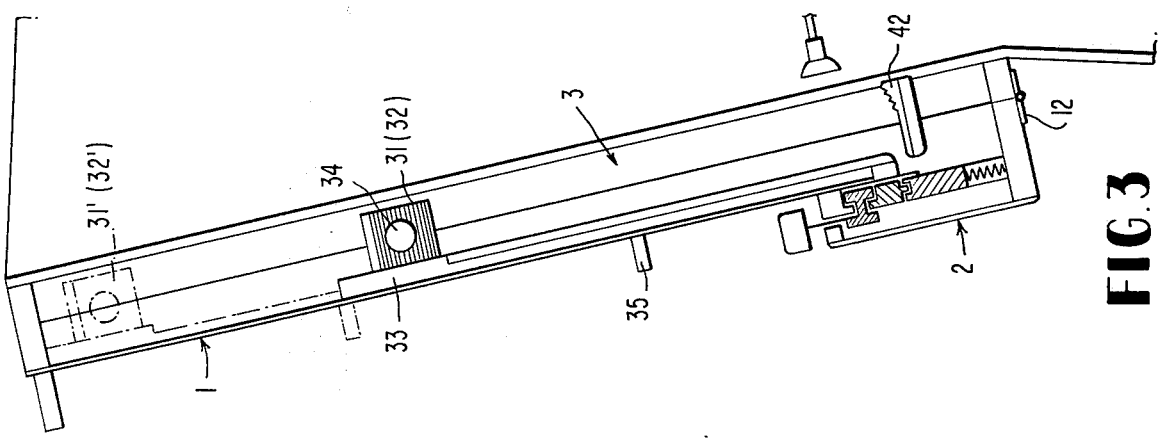
FIG. 3 is a side view of housing 11.

The operation of the film discharging mechanism 3 will be best understood by the following description with reference to FIGS. 3 and 4. When the gripping members 31 and 32 are slid from the position as indicated by the full line to the position as indicated by the dotted line, the bag 61, with the lower end cut by the cutter portion 2, and the doubling plate 62 are raised, the film sheets 6 received therein remaining while their lower ends are discharged from the bag 61. In this case, if the doubling plate 62 is connected at the top in a ⌐ shape in section to form the plate on one side of the stack of film sheets and the plate on the opposite side of the stack of film sheets into an integral relationship, a raised member 34 can be provided on the gripping members 31 and 32 so that the latter can be slid with the doubling plate 62 covered by the bag 61. This operation of the film discharging mechanism 3 can be carried out by means of a sliding knob 35 connected to the sliding plate 33 in a light-tight manner and mounted on the outer wall of the housing 11. This film discharging mechanism 3 is constructed so that only the lower ends of the film sheets 6 are discharged from the bag, and therefore the film sheets 6 can be fitted in the bag 61 and doubling plate 62 when the knob 35 is lowered from its raised position. This is due to the fact that the lower end receives most of the load of the film 6 to minimize loads applied to the surface, and a relatively firm material such as polyethylene in the range from about 150 to 200 micron is usually used in consideration of conditions such as the light-tightness required for the bag 61 in its nature whereby the bag 61 is never torn off.

With the arrangement as described above, the exposure of film can be minimized even if the film loading portion 1 should accidentally be opened. Furthermore, the bag 61 is a laminate which is impermeable to moisture and doubling plate 62 is normally made of a hygroscopic material and, thus, even if the bag 61 contains some amount of moisture, the doubling plate 62 absorbs such. In addition difficulties such as adhesion of the emulsion surface can be avoided even when the loaded film is left under conditions of high temperatures and high humidity due to the hygroscopic nature of doubling plate 62.

Referring again to FIG. 1, a film removal portion 4 is provided with a plurality of suction discs 41, which are moved in a synchronous relationship with a rotable crank 43. These suction discs 41 are synchronized through a vacuum mechanism (not shown) so as to attract and remove only the top sheet using a vacuum. A separator member 42 is provided to better separate the top sheet of the film from the next sheet of film.

As is apparent from the above, in use of the film removal device according to the present invention the film received in the bag is loaded in the housing 11 with the housing opened, the housing is then closed and the lower end of the bag 61 is cut in a light-tight state, and thereafter the bag 61 and the doubling plate 62 are raised to discharge the lower portion of the film 6. The lower portion of the film thus discharged is attracted by the suction discs 41 so that sheets of film can be removed sheet by sheet.

From the above-described arrangement of the present invention, it can be understood that both the bag and the doubling plate are raised to expose the lower ends of the film sheets, thus preventing the film from being scratched or pressure applied to the film, and in addition, the doubling plate can be operative even if the size of this plate is made sufficiently large as compared with the size of film in order to satisfactorily attain the effect of the doubling plate. Furthermore, the present device provides the ability to use any film without application of a specific working, such as notching, to the film.

While the invention has been described in detail and with reference to specific embodiments thereof, it will be apparent to one skilled in the art that various changes and modifications can be made therein without departing from the spirit and scope thereof.

What is claimed is:

1. A photographic sheet film feeding device comprising:

a film loading means for receiving stacked sheets of film, said film sheets being covered by an inverted U-shaped doupling plate and contained in an internally loaded bag in a light-tight condition and supporting said film sheets and said bag in an upright position, a cutter mechanism for cutting and unsealing the lower end of said internally loaded, upright bag, and a film discharging means for raising the upper end of said internally loaded bag and said U-shaped doubling plate covering the front, rear and upper edge of the upright film sheets in order to uncover the sheets of the film contained in said bag from the raised portion of said internally loaded bag.

2. The feeding device of claim 1, further including means for locking the lower end of said upright internally loaded bag in a position for cutting the lower end of said internally loaded bag with the cutter mechanism.

3. The feeding device of claim 1, wherein said film discharging means comprises gripping members for gripping the upper end of said upright internally loaded, bag and an upper portion of said doubling plate.

4. The feeding device of claim 1, further including a sheet removal means comprising suction cups synchronously activatable and operatively positioned relative to said uncovered sheets of film for removing under vacuum pressure, a sheet of film from said uncovered stack of film sheets and means for releasing the vacuum pressure to discharge the sheet of film removed from said stack at a desired position.

* * * * *

UNITED STATES PATENT OFFICE
CERTIFICATE OF CORRECTION

Patent No. 3,934,150  Dated January 20, 1976

Inventor(s) Takaaki Matsumoto et al.

It is certified that error appears in the above-identified patent and that said Letters Patent are hereby corrected as shown below:

The term of this patent subsequent to October 14, 1992, has been disclaimed.

Signed and Sealed this

Sixth Day of July 1976

[SEAL]

Attest:

RUTH C. MASON
Attesting Officer

C. MARSHALL DANN
Commissioner of Patents and Trademarks